Oct. 16, 1962     M. C. IRANI     3,058,817
APPARATUS FOR CHLORINATION OF REFRACTORY MATERIALS
Filed April 25, 1957     3 Sheets-Sheet 1

INVENTOR
MEHERWAN C. IRANI

INVENTOR
MEHERWAN C. IRANI

Oct. 16, 1962  M. C. IRANI  3,058,817
APPARATUS FOR CHLORINATION OF REFRACTORY MATERIALS
Filed April 25, 1957  3 Sheets-Sheet 3

INVENTOR
MEHERWAN C. IRANI

United States Patent Office 3,058,817
Patented Oct. 16, 1962

3,058,817
APPARATUS FOR CHLORINATION OF REFRACTORY MATERIALS
Meherwan C. Irani, Pittsburgh, Pa., assignor, by mesne assignments, to Metal Chlorides Corporation, Carnegie, Pa., a corporation of New York
Filed Apr. 25, 1957, Ser. No. 655,064
13 Claims. (Cl. 23—284)

This invention relates to the chlorination of refractory materials and particularly to methods and apparatus for the chlorination of highly refractory ores, such as the oxides and silicates of the metals of the class including titanium, zirconium, molybdenum, vanadium, columbium, tantalum and the like. Highly refractory ores can be chlorinated at temperatures from about 600° C. to 1500° C. in the presence of carbon. This method has, however, been impracticable prior to the present invention because of the difficulties of operating under the conditions required by previously known methods. Heretofore, oxides of these refractory materials have been mixed with carbon black and pelletized or briquetted. The pellets or briquettes are then stacked in a shaft type furnace and heated. Chlorine is then passed semi-continuously into the shaft furnace to convert the oxides to the refractory metal chlorides desired. The heat necessary to maintain the reaction has been produced by passing oxygen into the shaft furnace to consume a portion of the carbon from the briquetted or pelletized materials or, alternatively, by passing electrodes through the wall of the furnace and carrying a current through the packed briquetted or pelletized ores which act as a resistance and are themselves heated. These furnaces have been unsatisfactory. Their efficiency is very low. They tend to bridge and to pack so that large amounts of material are lost or wasted. When electrical resistance methods are used, the variation in resistance of the charge as the reaction takes place varies so greatly as to be almost impossible to control and complex control mechanisms are necessary in order to attempt to control temperature. Moreover, it has been almost impossible to contain the chlorine used in the chlorination reaction. As a result of these problems, direct chlorination of refractory metal ores and oxides has not been practiced to any worthwhile extent.

I have discovered a method and an apparatus which overcomes all of the problems heretofore associated with direct chlorination of refractory metal ores. I have devised an apparatus and a method which makes possible the chlorination of refractory metal ores with a high efficiency of the ore, carbon and chlorine, as well as high efficiency in the use of electrical power.

I provide a method of chlorinating refractory metal ores by fluidizing the ore and carbon in a chlorine stream and passing the mixture through a graphite tube at a velocity such that substantially no solids settle during the passage of the materials through the graphite tube, all the while maintaining a compatible gaseous atmosphere around the graphite tube at a partial pressure substantially the same as the partial pressure of chlorine in the graphite tube. I provide an apparatus in which this method can be carried out. I provide a graphite reaction tube, an impervious jacket or housing surrounding and spaced from said tube, said jacket and said tube being separated by finely divided insulating material such as powdered carbon black, electrode means spaced on the tube introducing current to the tube whereby the tube acts as a conductor between the electrodes and is heated thereby and means introducing a flowing stream of ore and carbon in chlorine gas through the tube. Preferably, the jacket or housing surrounding the tube is of low carbon steel or similar gas impervious material which surrounds the tube in gas-tight manner. The jacket is spaced a distance such that it remains at a temperature level sufficiently low to be unreactive with the chlorine. The jacket is preferably filled with powdered carbon black to act as an insulating material. However, any other insulating material which will withstand the temperature aljacent the tube may be used. Preferably, the graphite reaction tube is surrounded by chlorine gas at a partial pressure substantially the same as the partial pressure of the chlorine in the reaction tube. This is accomplished simply by the inherent porosity of the graphite tube. Alternatively, a compatible non-reactive gas such as the inert gases or nitrogen could be introduced into the area between the shell and the graphite tube. Preferably, the electrodes are water-cooled to protect them from the high temperature at the tube surface.

While I have generally described certain objects, advantages and purposes of this invention in the foregoing general statement, other objects, advantages and purposes will be apparent from the following description of a preferred embodiment and from the accompanying drawings.

Figure 1:
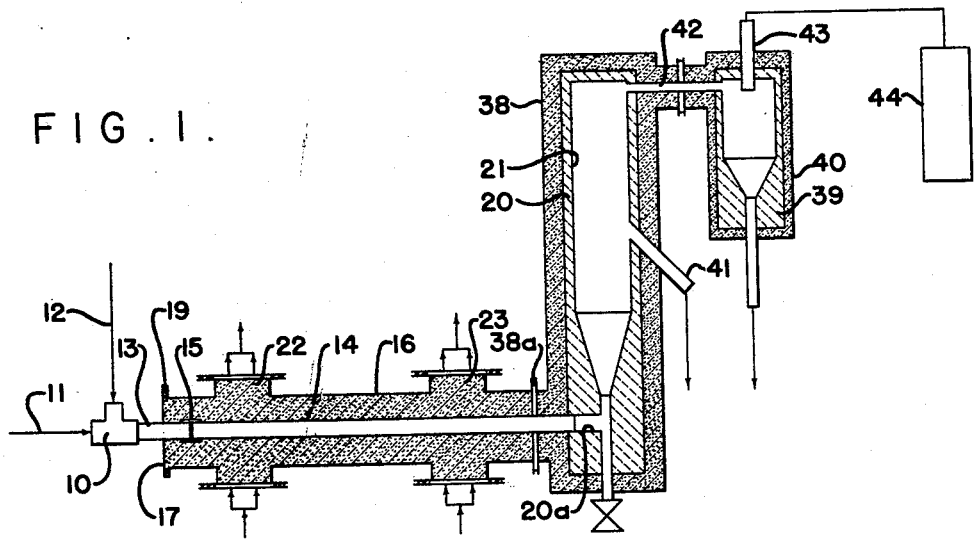
FIGURE 1 is a section through a preferred embodiment of my invention.

Referring to the drawings, I have illustrated a mixing nozzle 10 receiving chlorine gas under pressure from a line 11 and mixed ore and carbon through a line 12. The chlorine under pressure mixes with the ore and carbon to entrain it and carry it through a nickel inlet tube 13 to the graphite reaction tube 14. The nickel inlet tube 13 and the graphite reaction tube 14 are connected by a graphite sleeve 15 machined to slidably fit over each of the nickel and graphite tubes. Preferably, the nickel tube 13 is spaced slightly from the graphite tube 14 in the sleeve 15 to permit expansion and contraction of the tubes during heating. The reaction tube 14 is surrounded by an outer steel shell 16 fastened to a flange 17 on the nickel tube 13 by means of bolts 18. The joint so formed is sealed by an insulating gasket 19. The end of the reaction tube 14 opposite the inlet tube 13 is slidably connected to an opening 20a in a graphite housing 20 carrying a chamber 21.

Spaced graphite electrodes 22 and 23 are connected adjacent opposite ends of the reaction tube 14. The electrodes 22 and 23 are made up of two blocks of graphite 24 and 25 on opposite sides of the reaction tube 14. Each of the blocks 24 and 25 is provided with a semicircular groove 26 adapted to fit snugly against the outer walls of the reaction tube 14 in clamping engagement. Holes 27 are drilled through the electrodes to receive hollow nickel tubes 28 which are threaded at their ends to receive fastening nuts 29 to lock the blocks 24 and 25 in place on the tube 14. The ends of the tubes 28 extend out through manholes 30 in the shell 16. The manholes 30 are sealed with a cover 31, insulating gasket 32 and clamping bolts 33. Each of the tubes 28 passes through an opening 34 in the cover 31 and is surrounded by an insulating and sealing washer 35. The cover 31 is held in place by nuts 36 threaded along the tubes 28. Electrical current is introduced to the tube 16 by means of an electrical conductor 37 connected to the ends of the tubes 28. Water is passed through the tubes 28 in order to cool them and reduce the corrosion and erosion of the tubes.

The graphite housing 20 is surrounded by a steel shell 38 which is bolted to the shell 16. An insulating and sealing gasket 38a seals the joint between the two shells 16 and 38. A graphite cyclone 39 is connected to the chamber 21 to receive material therefrom. The cyclone 39 is likewise surrounded by a steel housing 40 connected to the housing 38 through an insulating and sealing gasket. The interior of the shells 38 and 40 as well as the shell 16 is filled with finely divided carbon black surrounding the reaction tube 14, the housing 20 and the cyclone 39.

Refractory metal ore and carbon is fed through the tube 12 into the nozzle 10. High pressure chlorine is dispersed from the line 11 through the nozzle 10 and carries with it a sufficient charge of ore and carbon for reaction. The chlorine is moved at a speed sufficient to maintain the solid ore and carbon in suspension throughout the system. The tube 14 is heated to the temperature at which the chlorine will react with the carbon and the refractory metal to form the refractory metal chloride. The products of the reaction are swept through the tube 14 into the chamber 21. Unreacted ore and carbon are formed into a fluidized bed in the lower portion in the chamber 21. In order to maintain a desired level in the chamber 21, a portion of these unreacted materials is drawn off through an outlet port 41. Preferably the fluidized bed in chamber 21 is held at a temperature which results in the condensation of high boiling reaction products, while allowing the lower boiling fractions to pass continuously through the chamber 21 and through the tube 42 to the cyclone 39 where any fine dust remaining in the gases is removed. The low boiling fraction vapor product remaining is then carried through the outlet tube 43 to the product condenser 44 where it is cooled and condensed and from which it is collected.

It will be noted from the drawings and foregoing description that the shells 16, 38 and 40 form an integral housing impermeable to gas about the entire reaction and separation system so that chlorine cannot escape from the system at any point.

Figure 2:
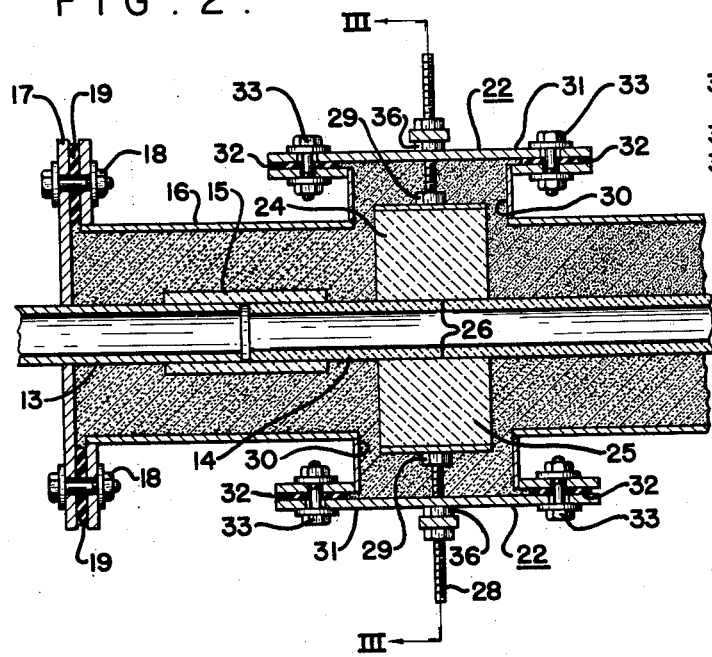
FIGURE 2 is an enlarged section of the entry end of the reaction tube according to the embodiment shown in FIGURE 1.
Figure 3:
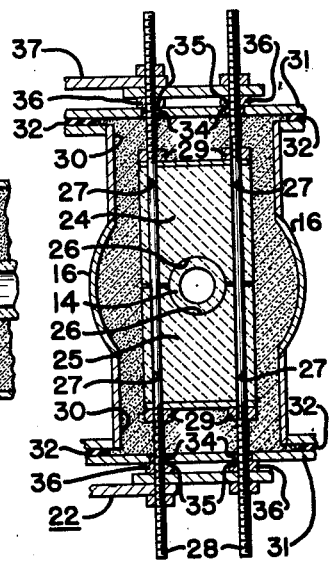
FIGURE 3 is a section on the line III—III of FIGURE 2.
Figure 4:
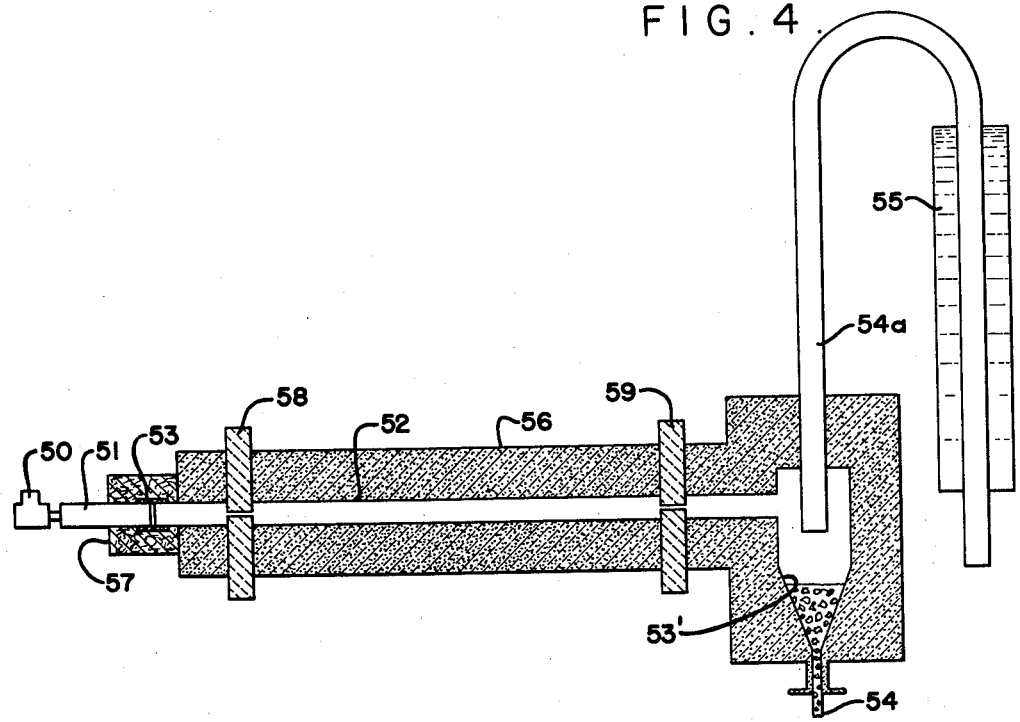
FIGURE 4 is a section through a second embodiment of my invention.

Referring to FIGURE 4, I have illustrated an inlet nozzle 50, an inlet tube and nozzle 51 similar to the nozzle 10 and inlet tube 13 of the embodiment shown in FIGURES 1 through 3. A graphite reaction tube 52 is connected to the inlet tube 51 by a graphite connector 53 in the manner shown in FIGURES 1 through 3. The tube 52 connects directly to a graphite cyclone 53' which discharges the solid unreacted material through a bottom outlet 54 and the vapors through an outlet line 54a to a condenser 55. The entire graphite cyclone 53' and graphite reaction tube 52 are surrounded by an integral steel shell 56 connected to a flange 57, similar to the flange 17 of FIGURES 1 through 3. The area between the tube 52 and cyclone 53' and the shell 56 is filled with powdered carbon black as an insulator. Electrodes 58 and 59 are connected to the tube 52 through manholes in the shell 56 in the same manner as electrodes 22 and 23 of FIGURES 1 through 3.

In the embodiment shown in FIGURE 4, the ore and carbon are introduced into the mixing nozzle 50 to be picked up by chlorine gas and carried into the inlet tube 51 and reaction tube 52 in a stream sufficiently rapid to maintain the solid ore and carbon in a fluidized and suspended condition until they are discharged into the cyclone 53. Unreacted materials are discharged through the bottom of the cyclone and the hot vapors are carried through tube 54 to condenser 55 where they are condensed and collected.

Figure 5:
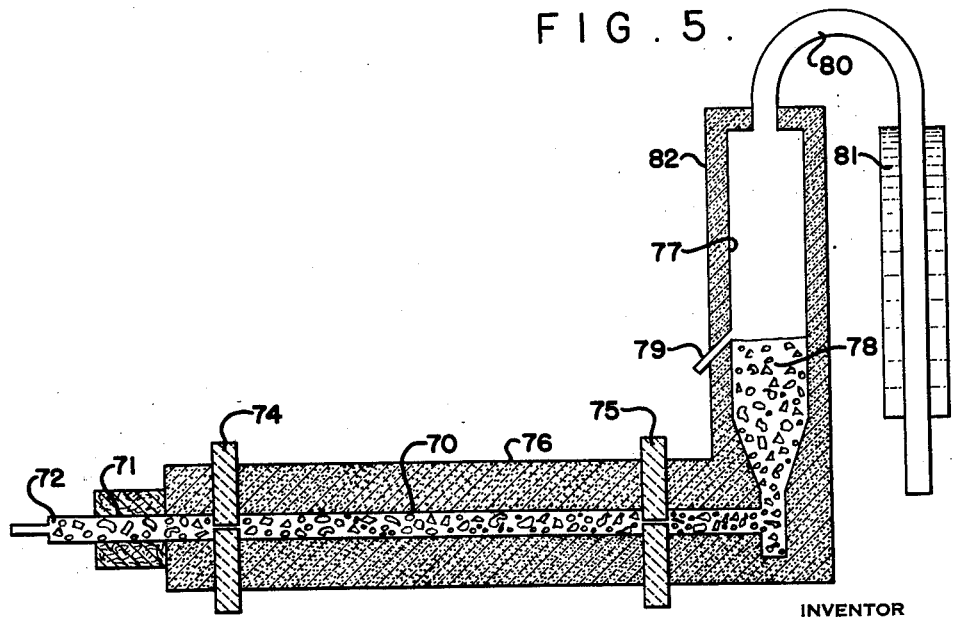
FIGURE 5 is a section through a third embodiment of my invention.

Referring to FIGURE 5, I have illustrated a reaction tube 70 connected to an inlet tube 71 fed from an inlet nozzle 72 in the same manner described with reference to similar members in FIGURES 1 and 4. The tube 70 is heated by electrodes 74 and 75 passing through manholes in shell 76 in the same manner as the electrodes in shell 16 of FIGURE 1. A graphite chamber 77 is connected to the end of the tube 70 to receive the products from the reaction. The unreacted carbon and ore are maintained in a fluidized bed 78 of fixed level in the chamber 77. The excess material is carried off through the side delivery tube 79. The uncondensed gaseous reaction products are carried out of the chamber 77 through the tube 80 to condenser 81. The chamber 77 is surrounded by a shell 82 integrally connected with the shell 76 to prevent the escape of gases from the reaction tube 70 and chamber 77. The shells 82 and 76 are filled with finely divided carbon black surrounding the chamber 77 and tube 70 to insulate the shell from the hot tube.

Figure 6:
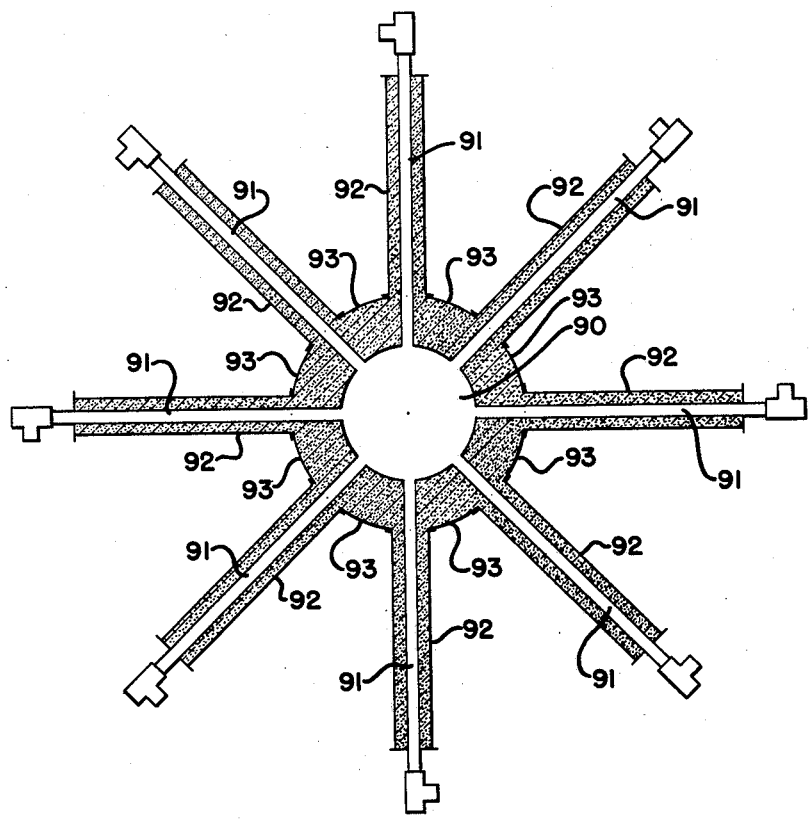
FIGURE 6 is a top plan view of a manifold form of my invention.

In the embodiment illustrated in FIGURE 6, I have shown a chamber 90 of graphite connected adjacent the bottom to a series of radially extending reaction tubes 91. Each of the tubes 91 is fed by an inlet tube and nozzle identical with the tube 13 and nozzle 10 of FIGURES 1 through 4. The tubes 91 are surrounded by an outer shell 92 which in turn is integrally connected at one end to a shell 93 surrounding the chamber 90. The opposite end of shell 92 is connected to a flange on the inlet tube to form an impervious housing around the radial reaction tubes and the central bed 90. Chlorine gas and mixed ore and carbon are fed into the reaction tubes 91 in exactly the same manner as in FIGURE 1 and the structure introducing the gas is identical. The material is passed in substantially fluid state through the reaction tube 91 into the chamber 90 where it forms a fluidized bed with the unreacted ore and carbon. The uncondensed products of reaction are carried either to a cyclone (as in the case of FIGURES 1 through 4) and from there to a condenser or are carried directly from the chamber 90 to a condenser depending on whether or not small amounts of finely divided unreacted solids remain in the gases leaving the fluidized bed in chamber 90.

While in the specification and claims the term "graphite" has been used, it will be understood, of course, that both graphite and carbon comprising different forms of carbon are intended by the term "graphite" in the specification and claims.

While I have illustrated and described certain presently preferred methods and apparatus for performing my invention, it will be understood that this invention may be otherwise embodied within the scope of the following claims.

I claim:

1. Apparatus for chlorinating refractory metal ores and the like comprising means for suspending the ore to be treated with finely divided carbon in chlorine gas, a gas-permeable graphite reaction tube provided with inlet and outlet means receiving the suspension, an outer gas-tight housing surrounding the reaction tube and sealing said tube from the atmosphere, said housing being insulated via finely-divided particulate solids from said tube, and longitudinally spaced electrode means directly engaging the exterior of said reaction tube laterally to carry electrical energy to said tube whereby the tube is heated by passage of electrical current therethrough.

2. Apparatus for chlorinating refractory metal ores and the like comprising means for suspending the ore to be treated with finely divided carbon in chlorine gas under pressure sufficient to maintain the ore and carbon in suspension, a gas-permeable graphite reaction tube provided with inlet and outlet means receiving the suspension, an outer gas-tight housing surrounding the reaction tube and sealing said tube from the atmosphere, said housing being insulated from said tube and longitudinally spaced electrode means biased laterally against the wall surface of said tube sealed through the housing, and insulated therefrom, along the length of the reaction tube directly engaging said tube in electrical contact to carry electrical energy to said tube whereby the tube is heated.

3. Apparatus for chlorinating refractory metal ores comprising means for admixing the refractory metal ore with carbon and chlorine gas under conditions such that the mixture remains in suspension, a gas-permeable graphite reaction tube receiving material from the mixing means, an outer gas-tight housing surrounding the reaction tube and sealing said tube from the atmosphere, separator means receiving the products from the graphite reaction tube, said separator means including a graphite receiving chamber surrounded by gas impervious housing sealingly connected to the housing surrounding the reaction tube, insulating means surrounding the reaction tube and the collecting chamber between the housing and said tube and chamber and condenser means connected to said chamber receiving the gaseous products from the reaction.

4. Apparatus for chlorinating refractory metal ores comprising spaced means for admixing the refractory metal ore with carbon and chlorine gas under conditions such that the mixture remains in suspension, a plurality of radially spaced gas-permeable graphite reaction tubes corresponding in number to the spaced means for mixing and connected thereto to receive the gaseous suspension therefrom, an outer gas-tight housing surrounding each reaction tube and sealing said tube from the atmosphere, central separator means receiving the reaction products from each reaction tube, said separator means including a graphite receiving chamber surrounded by a gas impervious housing sealingly connected to the housing surrounding the reaction tube, insulating means surrounding the reaction tubes and chamber between the housings and the tubes and chamber and condenser means connected to said chamber receiving the gaseous products from the reaction.

5. A furnace consisting of an elongated, hollow, solid wall, carbon or graphite tube having an unobstructed central opening, surrounded radially, successively, for substantially its entire length, by a gas-tight shell, the annular space therebetween being filled with a finely-divided, free-flowing heat insulating material and at least two transversely disposed electrodes directly contacting said tube, whereby electrical current can be conducted to said tube and its electrical resistance used to heat said tube when electrical current is passed therethrough, said wall being freely gas-permeable, whereby the same partial pressure of a gaseous product passing through the opening in said tube exists on opposite sides of said wall.

6. A furnace as in claim 5 wherein said finely-divided insulation is finely-divided carbon or graphite.

7. A furnace as in claim 5 wherein pairs of diametrically-opposed electrodes are provided at spaced intervals, said electrodes being pressed against said tube to form good electrical contact therewith, and means to adjust the pressure with which said electrodes contact said tube.

8. A furnace comprising, in combination, a horizontally-disposed graphite tube surrounded radially, successively, by finely-divided, free-flowing heat insulating material and a gas-tight metal shell, said tube being provided with at least two electrodes in contact therewith, whereby electrical current can be conducted through said tube, whereby, via its electrical resistance, heating of said tube is effected, the opposite end of said tube opening into a vertically disposed product discharge chamber which, in turn, is provided with a cyclone separator, at its outlet, said chamber and separator being lined with carbon or graphite.

9. In a furnace including as a heating element thereof a centrally-disposed gas-permeable graphite tube surrounded by finely-divided heat insulation and an outer gas-tight housing, the provision of an electrode comprising two diametrically-opposed carbon or graphite elements fitted around said tube and means to adjust the pressure which said elements press against said tube.

10. A furnace as in claim 9 which is connected to a cyclone separator to discharge any solid material, thereby separating gaseous materials.

11. A furnace assembly employing a plurality of furnaces as defined in claim 9 wherein said furnaces are arranged radially with their discharge ends opening into a common central chamber.

12. Apparatus as in claim 1 wherein there are provided separator means receiving the products from the graphite reaction tube, said separator means including a graphite receiving chamber surrounded by a gas impervious housing sealingly connected to the housing surrounding the reaction tube, insulating means surrounding the reaction tube and the collecting chamber between the housing in said tube and chamber, and condenser means connected to said chamber receiving the gaseous products from the reaction.

13. Apparatus according to claim 1 wherein a plurality of said reaction tubes are arranged radially with means provided for admixing the refractory metal ore with carbon and chlorine gas, and central separator means receiving the reaction products from each reaction tube, said separator means including a graphite receiving chamber surrounded by a gas impervious housing sealingly connected to the housing surrounding the reaction tube, insulating means surrounding the reaction tubes and chamber between the housings and the tubes and chamber and condenser means connected to the said chamber receiving the products from the reaction.

References Cited in the file of this patent

UNITED STATES PATENTS

| | | |
|---|---|---|
| 1,481,228 | Rondelli | Jan. 15, 1924 |
| 1,528,319 | Carteret et al. | Mar. 3, 1925 |
| 1,763,229 | Fournent | June 10, 1930 |
| 1,925,784 | Williams | Sept. 5, 1933 |
| 2,020,431 | Osborne et al. | Nov. 12, 1935 |
| 2,422,501 | Roetheli | June 17, 1947 |
| 2,486,912 | Belchetz | Nov. 1, 1949 |
| 2,675,889 | Frey | Apr. 20, 1954 |
| 2,701,179 | McKinney | Feb. 1, 1955 |
| 2,777,756 | Anazawa et al. | Jan. 15, 1957 |
| 2,788,260 | Rick | Apr. 9, 1957 |
| 2,789,880 | Beaver | Apr. 23, 1957 |
| 2,798,819 | Schaumann | July 9, 1957 |

FOREIGN PATENTS

| | | |
|---|---|---|
| 673,163 | Great Britain | June 4, 1952 |